United States Patent [19]
Dobbek

[11] Patent Number: 5,835,930
[45] Date of Patent: Nov. 10, 1998

[54] ONE OR MORE LOGICAL TRACKS PER PHYSICAL TRACK IN A HEADERLESS DISK DRIVE

[75] Inventor: Jeffrey J. Dobbek, San Jose, Calif.

[73] Assignee: International Business Machines Corporation, Armonk, N.Y.

[21] Appl. No.: 629,684

[22] Filed: Apr. 9, 1996

[51] Int. Cl.[6] ................................................ G06F 11/00
[52] U.S. Cl. .................... 711/4; 711/202; 364/266.5; 395/182.06
[58] Field of Search .................... 395/182.03, 182.04, 395/404, 412, 182.06, 180; 371/5.1, 10.2, 28; 364/245, 265, 245.3, 266.5, 943.9; 711/4, 202

[56] References Cited

U.S. PATENT DOCUMENTS

| | | | |
|---|---|---|---|
| 4,432,025 | 2/1984 | Grogan | 360/48 |
| 4,858,034 | 8/1989 | Hassel et al. | 360/51 |
| 4,935,825 | 6/1990 | Worrell et al. | 360/54 |
| 5,166,936 | 11/1992 | Ewert et al. | 371/21.6 |
| 5,202,876 | 4/1993 | Takagi et al. | 369/58 |
| 5,257,362 | 10/1993 | Menon | 711/114 |
| 5,271,018 | 12/1993 | Chan | 371/10.2 |
| 5,293,565 | 3/1994 | Jaquette et al. | 369/32 |
| 5,297,148 | 3/1994 | Harari et al. | 371/10.2 |
| 5,319,627 | 6/1994 | Shinno et al. | 369/54 |
| 5,418,767 | 5/1995 | Gaudet et al. | 369/58 |
| 5,422,890 | 6/1995 | Klingsporn et al. | |
| 5,592,452 | 1/1997 | Yoshimoto et al. | 369/58 |

*Primary Examiner*—Eddie P. Chan
*Assistant Examiner*—Kevin Verbrugge
*Attorney, Agent, or Firm*—Merchant, Gould, Smith, Edell, Welter & Schmidt, P.A.

[57] ABSTRACT

A method and apparatus for mapping a physical track having more than a predetermined number of defective or spare sectors into two or more logical tracks to increase the number of defects the drive can handle in a constrained memory environment. The invention is particularly applicable to NoID™ disk drives. An interface processor is operatively coupled to a storage medium having concentric tracks for recording data therein. The interface processor maps physical tracks to logical tracks and determines whether defective and/or spare sectors exist in the physical track. The interface processor also redefines a physical track having more than a predetermined number of defective or spare sectors as at least one logical track. The at least one logical track has fewer than the predetermined number of defective or spare sectors within its boundaries. That is, a location for the defective and/or spare sectors is not mapped into the track detail. The dynamic track boundaries will change for each read or write.

56 Claims, 6 Drawing Sheets

ONE OR MORE LOGICAL TRACKS PER PHYSICAL TRACK IN A HEADERLESS DISK DRIVE

BACKGROUND OF THE INVENTION

1. Field of the Invention

This invention relates in general to data storage systems, and more particularly, to a method and apparatus for mapping a physical track having more than a predetermined number of defective sectors into two or more logical tracks.

2. Description of Related Art

As more complex applications are developed, even greater storage capacity is being added to computer systems. Thus, storage manufactures continue to push the envelope in terms of surface density of storage systems. To handle these storage requirements, intelligent disk controllers are being developed so that much of the control processing can be off-loaded from the central processor in the computer system. Because of this shift in functions, the central processor is not required to perform numerous functions and more overhead is available for primary functions. This allows increases in overall system performance and throughput.

Mass storage for a computer system may be provided by a media such as a hard disk drive, an optical drive system or magnetic tape. In a rotating media, concentric or spiral tracks are defined on the surface of the media for storing data. Each track is divided into a number of sectors that provide a logical division for storing blocks of data. Each sector represents a number of bytes of the data track.

When a recording media is manufactured, the disk surface is typically formatted into physical tracks and sectors. The disk is then tested by the manufacturer to determine the validity of each sector. Media defects introduced during the manufacturing process can damage a sector so that data cannot be stored within it. Further, additional sectors on the disk may become defective when the disk media is placed into service. A list of defective sectors is often maintained on the disk itself. When a disk drive is powered-up, the defect list is read from the disk surface and stored in random access memory (RAM). The disk controller then uses the information to avoid writing and reading data to and from the bad sectors.

Methods for managing or remapping bad sectors have been developed. For example, U.S. Pat. No. 5,271,018, issued to Litklo Chan, entitled "METHOD AND APPARATUS FOR MEDIA DEFECT MANAGEMENT AND MEDIA ADDRESSING", and hereby incorporated by reference, discloses a defect management scheme for mass storage devices. Data tracks formed on the surface of the storage media are divided into a plurality of zones. Each zone is divided into a number of logical partitions, each logical partition containing a fixed number of sectors. Each partition also includes at least one local spare sector at the end of the partition. Each zone includes a number of overflow spare sectors at the end of the zone. If there is a defect sector in a partition, the local spare sector is used to replace the defective sector. If there are more defective sectors in a partition than there are local spares, an overflow spare sector is used to replace the additional defective sectors. However, surface density is sacrificed as a result of this defect management scheme.

Further, higher surface densities unfortunately create the situation where disk defects may span many data sectors. This translates into a large number of defects per track in bad areas. In a headerless or NoID™ drive, a buffer is required to store the defect locations as well as spare sector locations. Thus, more defects require more memory to map them. NoID™ sector formatting enables capacity increases by removing sector identification information from the disk surface and by placing it into solid-state memory thereby allowing data to be stored where the sector identification information previously resided.

In systems where the defect tables are duplicated throughout the system, such as in a queued input/output environment, a substantial storage investment is required. Consequently, there is usually placed a maximum number of defects per track restriction during manufacturing qualification of a disk drive. When this limit is exceeded, the file or disk is scrapped, or alternatively, the track is ignored, resulting in a decreased yield or lower capacity. In the case of grown defects (i.e., defects occurring after manufacturing qualifications), a restriction is placed on the number of sectors which may be reassigned. Such restrictions cause hard failures during the operation of the devices. While methods are known that allow more defects per track, these are memory intensive and require more time to map an entire track of defects than that which is needed by the servo to switch to the next track or by the controller to finish one track and start on the next one. Thus, the time for processing defective sectors requires an additional revolution.

It can be seen then that there is a need for a method and apparatus for increasing the surface density of storage media.

It can also be seen that there is a need to improve the yield degradation due to excessively defective tracks.

It can also be seen that there is a need to reduce the time for processing remapped sectors to eliminate the need for an additional revolution.

SUMMARY OF THE INVENTION

To overcome the limitations in the prior art described above, and to overcome other limitations that will become apparent upon reading and understanding the present specification, the present invention discloses a method and apparatus for remapping a physical track having more than a predetermined maximum allowable number of defective and spare sectors per track into two or more logical tracks, each having fewer than the maximum number of allowable defects, to avoid throwing away the track and in turn the drive.

The present invention solves the above-described problems by counting the number of defective and/or spare sectors on a physical track and if the maximum allowable number of defects and/or spares is exceeded, dividing the physical track into two or more logical tracks, wherein each logical track has less than the predetermined number of defects and/or spares within its boundaries.

A system in accordance with the principles of the present invention includes a processor operatively coupled to a storage medium having concentric tracks for recording data therein. During a read or write operation, the processor maps logical block addresses to physical track addresses and determines whether defective or spare sectors exist in the physical track. The processor also remaps a physical track having more than a predetermined number of defective and/or spare sectors into two or more logical tracks, each having fewer than the predetermined number of defects within its track boundaries.

An aspect of the present invention is that defective sectors outside of and contiguous to the logical boundaries are discarded.

Another aspect of the present invention is that a locations for the defective or spare sectors above are not mapped into a defect or spare list.

Yet another aspect of the present invention is that the logical tracks are dynamically mapped so that their boundaries will vary from one data access to the next.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

According to the present invention, if any physical track is found to have more than the fixed number of allowable defects and/or spares, it will be remapped into two or more logical tracks, each logical track having fewer than the maximum number of allowable defects and/or spares. Each of these logical tracks is then treated like a physical track in normal drive operations.

Figure 1:
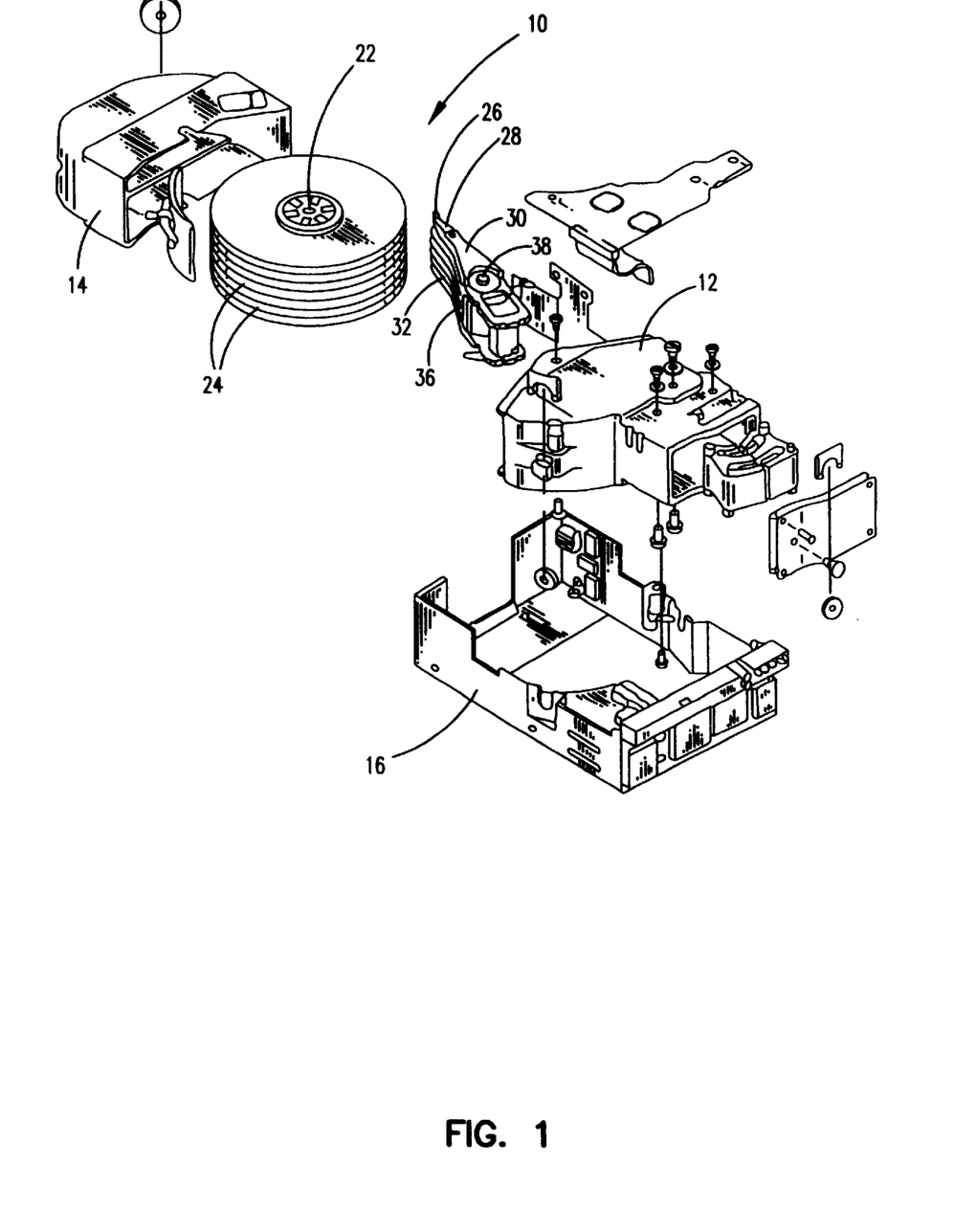
FIG. 1 is an exploded view of a magnetic storage device according to the present invention.

FIG. 1 illustrates an exploded view of a magnetic storage system 10. The disk drive 10 includes a housing 12 and a housing cover 14 which, after assembly, is mounted within a frame 16. Mounted within the housing is a spindle shaft 22. Rotatably attached to the spindle shaft 22 are a number of magnetic storage disks 24. In FIG. 1, eight disks 24 are attached to the spindle shaft 22 in spaced apart relation. The disks 24 rotate on spindle shaft 22 which is powered by a motor (not shown). Information is written on or read from the disks 24 by heads or magnetic transducers (not shown) which are supported by sliders 26. Preferably, sliders are coupled to the suspensions or load springs 28. The load springs 28 are attached to separate arms 30 on an E block or comb 32. The E block or comb 32 is attached at one end of an actuator arm assembly 36. The actuator arm assembly 36 is rotatably attached within the housing 12 on an actuator shaft 38. The rotary actuator assembly 36 moves the integrated transducer/suspension assembly in accordance with the present invention in an arcuate path across the surface of the storage disk 24. However, the invention is not meant to be limited to the disk drive described above. Those skilled in the art will recognize that any recording apparatus having a recording media with a physical track that has more than a fixed number of allowable defects and/or spares may be remapped into two or more logical tracks with each logical track having fewer than the maximum number of allowable defects and/or spares.

Figure 2:
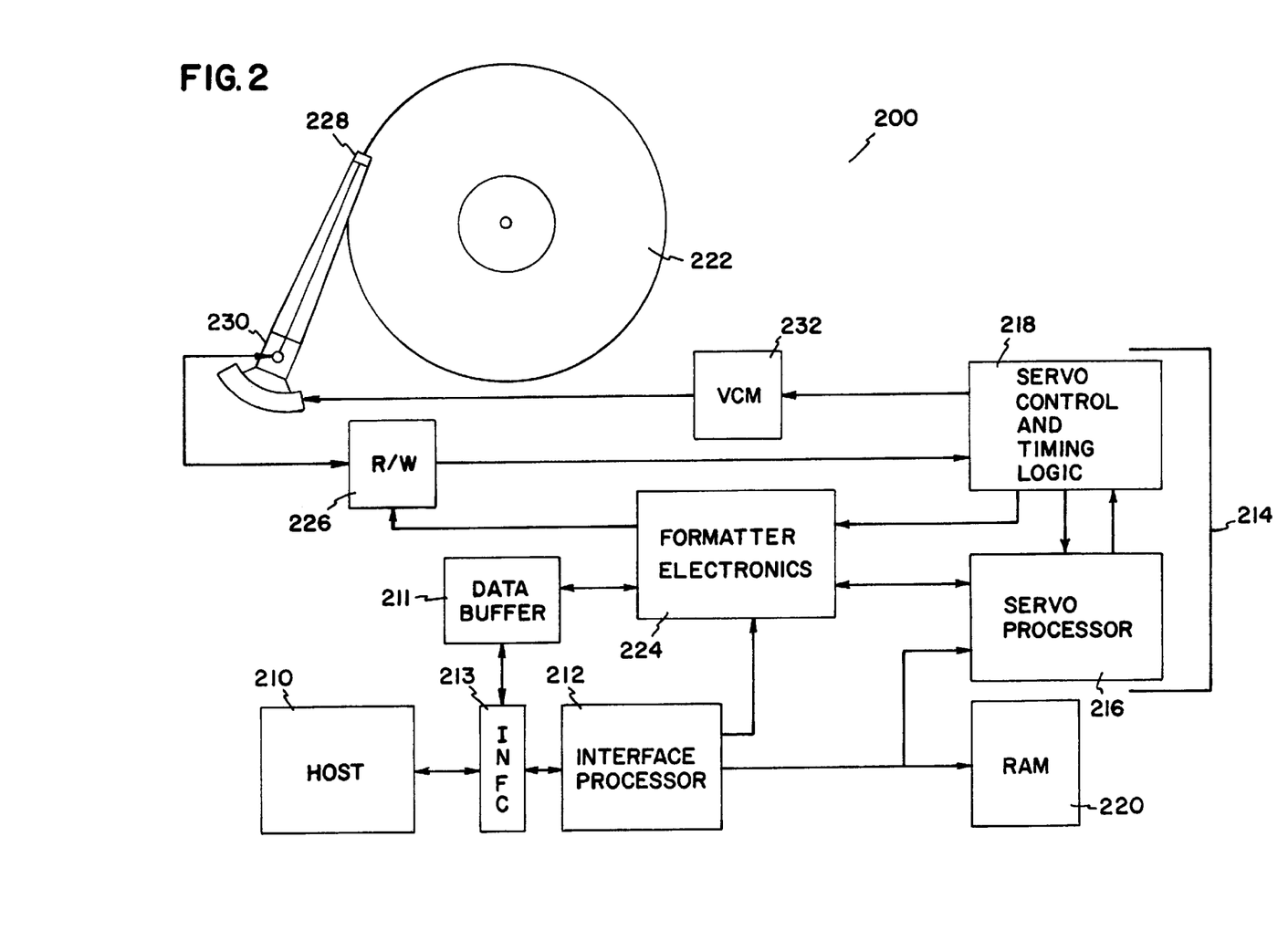
FIG. 2 illustrates a block diagram of a computer disk drive system in accordance with the invention.

FIG. 2 illustrates a block diagram of a computer disk drive system 200 suitable for practicing the invention. It shall be understood that the general read/write and servo functions of a disk drive are well-known in the art, and their particular implementation is not an aspect of the present invention unless expressly noted. A host computer system 210 may be coupled to a disk drive system 200 via an interface processor 212. The interface processor 212 processes commands from the host system 210 and in turn communicates with a servo controller 214. The servo controller 214 includes a servo processor 216 and servo control and timing logic 218. Data parameters may be stored in memory such as random access memory (RAM) 220 or data buffer 211, or alternatively the data may be stored on the disk 222 itself. The servo processor 216 is attached at the opposite end of the interface processor 212 and receives commands from the interface processor 212.

Data to be written to the disk 222 is routed to the formatter electronics 224. The read/write circuit 226 conditions the data and routes the data to the head 228 at the end of the actuator arm 230 for writing to the disk 222. Data read from the disk 222 by the head or sensor 228 is received by the read/write circuit 226. The data received from the head 228 is conditioned by the read/write circuit 226 to provide a read pulse output. The read pulse output is then routed to the formatter electronics 224 for processing before being provided to the host 210 via the data buffer 211 and interface electronics (INFC) 213. The interface electronics 213 is coupled to the bus from the host 210 and communicates with the interface processor 212 and data buffer 211.

The servo processor 216 provides control signals to the servo control and timing logic 218. The servo control and timing logic 218 interprets the control signals from the servo processor 216 and sends voice coil control signals to the voice coil motor 232. The voice coil motor 232 drives the actuator arm 230 in accordance with the control signals. The actuator arm 230 supporting the magnetic head 228 is driven by the voice coil motor 232 to move the magnetic head 228 to a target track position on the disk 222. The servo control and timing logics outputs to the servo processor 216 position data indicative of the track position corresponding to the current position of the magnetic head 228 from servo data read out from the disk 222.

Data is accessed from a disk drive using a logical addressing scheme. Thus, the host computer 210 identifies data in terms of a range of logical block addresses. These logical addresses are received by the interface processor 212 and must be translated into the actual physical disk locations or sectors containing (or to contain) the data. As part of the translation or "mapping" process, the interface processor 212 determines an appropriate track or group of tracks corresponding to the logical addresses, and for each of these tracks, determines which sectors are usable, defective or spare. In a disk drive incorporating NoID™ sector formatting, this process entails creating a track detail in RAM for each track containing the relevant information about the track. According to the present invention, the interface processor 212 maps a physical track into two or more logical tracks when a predetermined number of sectors of the physical track are identified as being defective and/or spare. However, those skilled in the art will recognize that an entire disk may be remapped into two or more logical tracks per physical track to increase yield.

Figure 3:
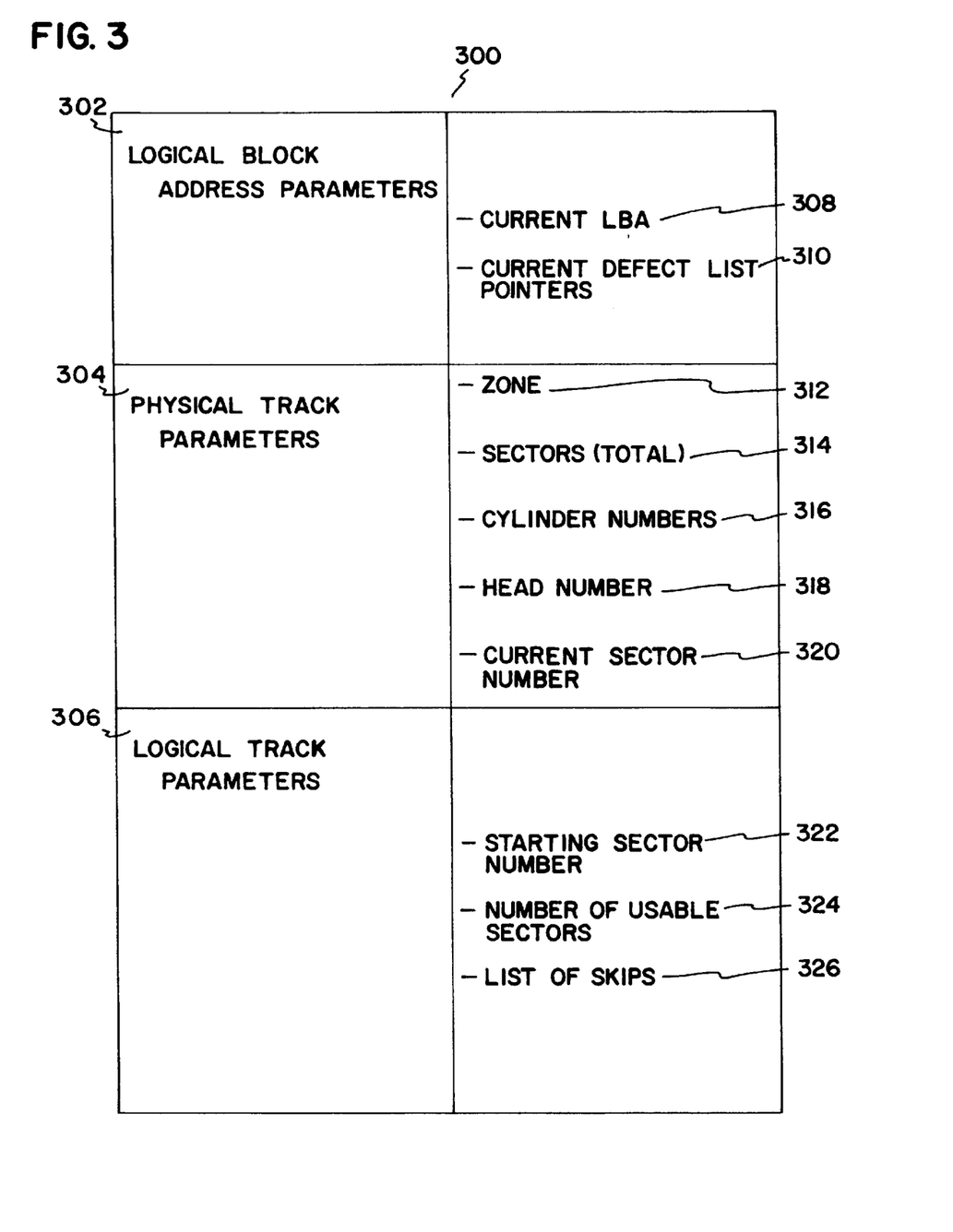
FIG. 3 illustrates a track detail for each logical track according to the invention.

An arbitrary limit of defects and/or spares forces the mapping of a logical track. FIG. 3 illustrates a track detail 300 which must be built for each logical track. The track detail includes three groups of information; the block address parameters 302; the physical track parameters 304; and the logical track parameters 306. The logical block address parameters include the current logical block address 308 and the current defect list pointer 310. The physical track parameters include the current data band or zone 312, the total number of sectors per physical track of the current data band 314, the cylinder number 316, the head number 318, and the physical track sector number 320. The logical track parameters 306 include the starting logical track sector number 322, the number of usable sectors on the logical track 324, and a list of skipped physical sector locations 326.

Creation of the list and detail 300 is halted for each logical track of a physical track whenever the arbitrary limit is met. Consecutive defects at the very beginning and at the very end of each logical track are not counted or stored in the track detail 300. When remapping of the physical track is complete, it now corresponds to two or more track details 300 which describe "logical" tracks. The microcode that drives the actual transfer via NoID™ hardware and/or formatter hardware will treat each logical track as a full track. That is, the microcode simply uses the information in each logical track detail 300 to drive the transfer.

As with normal tracks, all activity with regards to the servo seek to cylinder and head is driven from the information inside the track detail 300. When the transfer of data for the current track is complete, the controller merely proceeds to the next logical track. The controller begins mapping the new track. The track detail 300 is called to obtain the next track and if required, a real seek is performed.

Figure 4A:
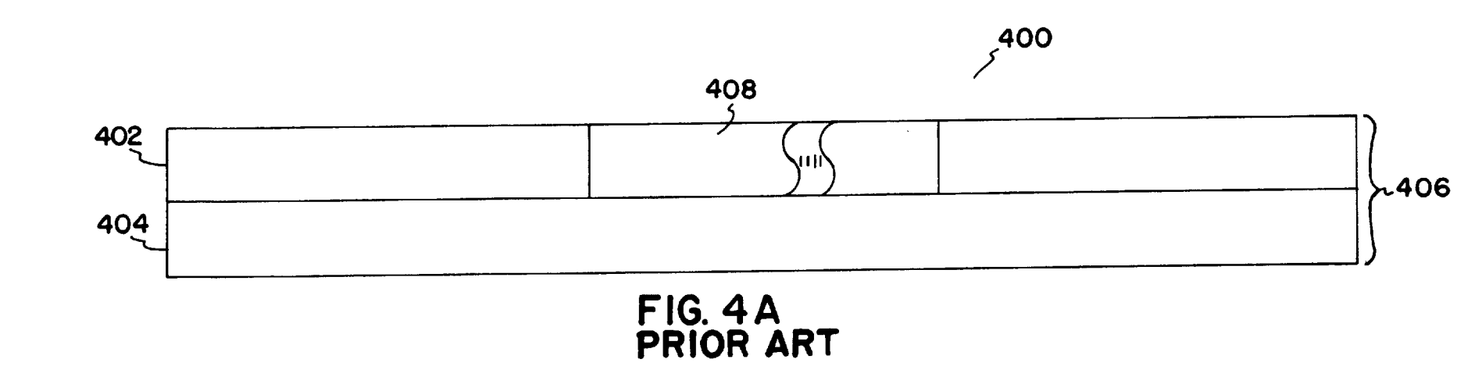
FIG. 4a illustrates the mapping of physical track address to logical block address according to the prior art.
Figure 4B:
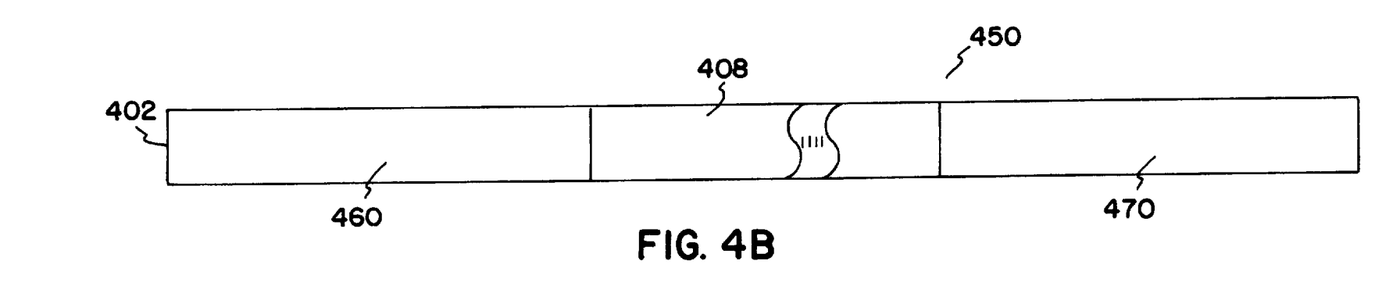
FIG. 4b illustrates the mapping of physical track address to logical block address according to the invention.

FIGS. 4a and 4b illustrate the mapping of physical tracks into logical tracks. Physical tracks comprise a plurality of physical addresses. Due to track defects, however, the usable physical sectors are not always contiguous. For this reason, physical tracks are usually mapped into logical tracks comprising logical blocks of contiguous data fields so that the host device can address data without regard to its precise location on the disk. Logical tracks have a variable or fixed length, and typically comprise one or more physical tracks. According to the present invention, a physical track is remapped into two or more logical tracks if it is found to have the maximum number of allowable defects and/or spares. Each of these tracks is then treated like a physical track. The present invention applies both at manufacturing time and during normal operation. That is, defective portions of a track may be mapped out in memory at manufacturing time, and the defect maps may be updated dynamically as additional defects develop over time during operation.

FIG. 4a illustrates the mapping 400 of a physical track to a logical track according to the prior art. In FIG. 4a two physical tracks are shown 402, 404. According to the prior art, tracks 402 and 404 may be mapped into a single logical track 406. In the first track 402, a block of defective sectors 408 are detected. If the number of defective and/or spare sectors is greater than a predetermined limit, then the entire logical track or file may be thrown away. If the number of defective and/or spare sectors 408 does not exceed the limit, then the location of the defective sectors are stored in a defect list in memory, and any spares are recorded in a spares list. During a read or write operation, the defect and spares lists are used to create a "track detail." As described above, a track detail includes, for example, the current logical block address, the current defect map pointer, the current cylinder, head and sector, the number of sectors on a physical track, the starting logical track sector, the logical track sector count not including defects or spares, and the defect or spare count and list.

FIG. 4b illustrates the mapping 450 of physical track to logical track according to the invention. In FIG. 4b, the track 402 is shown again having a number of defective sectors 408 located therein. In FIG. 4b, the track 402 is shown with contiguous defective sectors 408. However, those skilled in the art will recognize that the defective sectors 408 may in fact be dispersed within the track.

According to the invention, if the number of defective sectors 408 does not exceed the limit, then the track is treated in the same manner as in the prior art. However, if the number of defective and/or spare sectors 408 exceeds a predetermined limit, the defective and spare sectors contiguous at the limit are discarded, and the first usable sector after the block of defective sectors 408 initiates a new logical track 470. Thus, both logical tracks comprising one physical track and two or more logical tracks per physical track may coexist on the same device. The physical track with excessive defects may be mapped into a single logical track if the defect and/or spare limit is reached at the end of the physical track, and with its internal defects being included in the track detail. Since the location of the defective sectors 408 need not be mapped into a track detail list (although it will be recorded in the defect map), and because the area comprising the new logical track 470 is not discarded, surface density is maximized.

Figure 5:
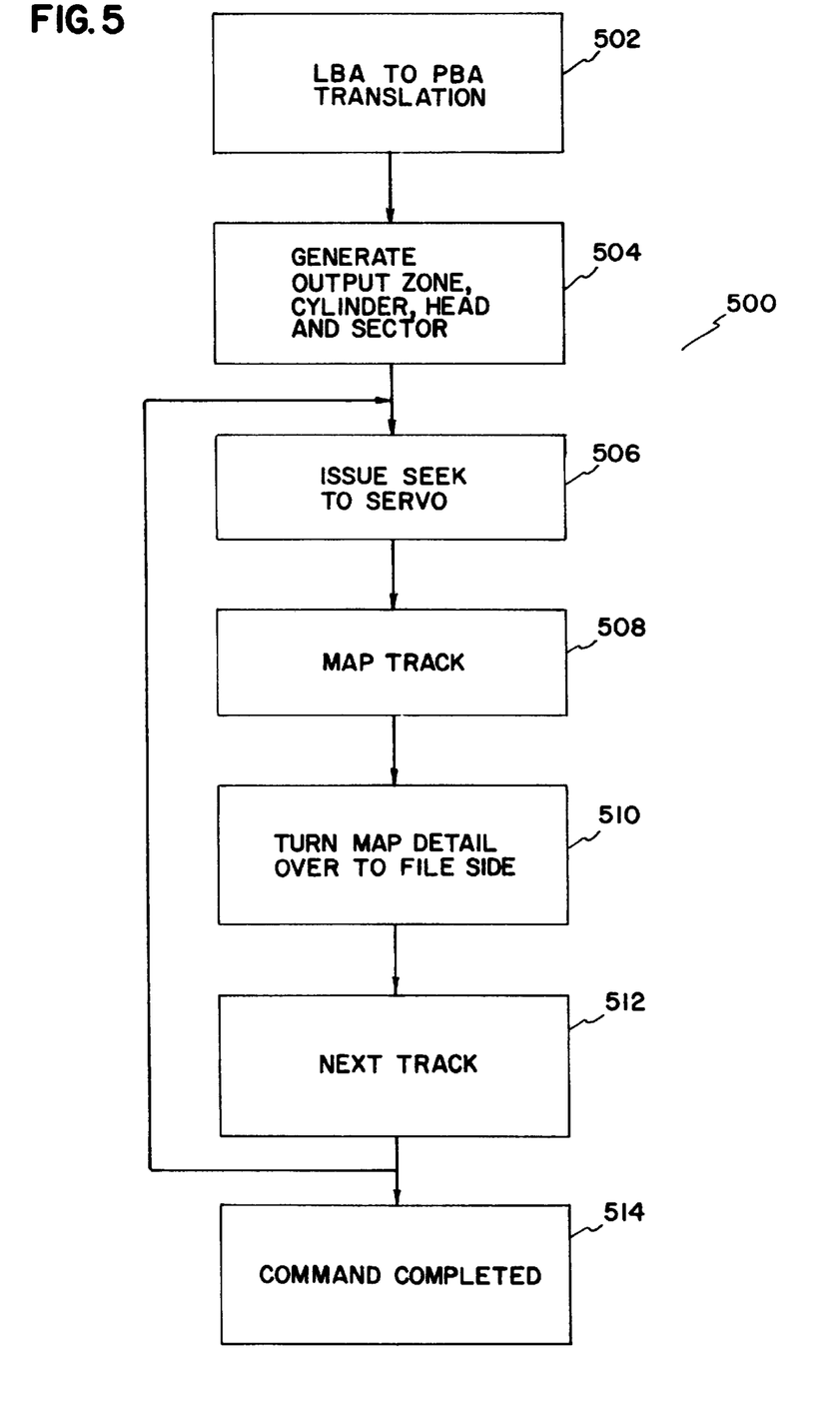
FIG. 5 illustrates the mapping of tracks during a transfer command.

FIG. 5 illustrates the mapping of tracks during a transfer command 500. In step 502, the customer has asked for a block of data using a range of logical addresses, and the controller has determined the physical block address (the sector offset into the file starting at cylinder 0, head 0, and sector 0) corresponding to the first logical block address. In step 504, the zone, cylinder, head and sector identifying the physical location of the block of data is generated. In step 506, the servo is issued a seek command to move the head to the appropriate radial location. However, if the servo does not need to move, as is the case when end of the physical track has not been reached but the next logical track is called for, the seek command is ignored. In step 508, a track detail is created. The location of the requested data is mapped to physical locations until the entire data track (logical or physical, depending on current track type) is mapped.

In step 510, once the entire data track (logical or physical) is mapped, the map is turned over to the file side where the commands for moving the data to or from the disk are generated. In step 512, the controller moves along to the next track. The controller checks whether there are still sectors left to scan on the physical track. If there are sectors left to scan, the controller loops back to issue a seek command to the servo 506. Preferably, if no sectors are left to scan, the counter for the head is incremented. Then, if the counter value for the head is equal to the number of total drive heads, the counter is reset to zero, the first head is selected, and the cylinder is incremented. If the cylinder is the first cylinder for the next data band, then the data band is incremented and new data sectors are loaded per the physical track count. If the command for data is completed, then the process is terminated in step 514.

Except for the operation in the step 508 for mapping the track and step 512 for determining the next track, the flowchart 500 is applicable to both the prior art and the present invention. The interrelation between step 508 for mapping the track and step 512 for determining the next track according to the invention is illustrated in greater detailed in FIG. 6.

Figure 6:
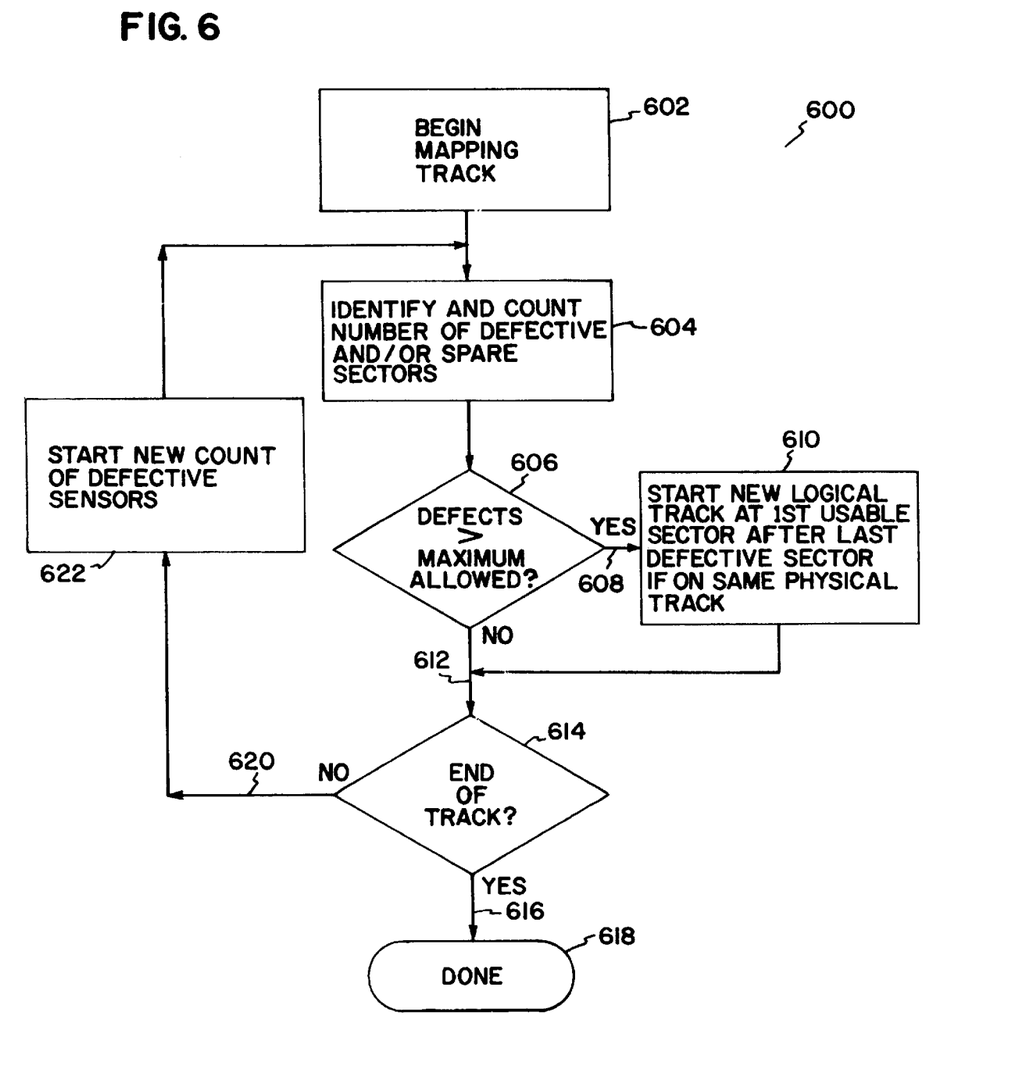
FIG. 6 illustrates a flowchart for identifying the interrelation between the mapping of a track and determining the next logical track starting point according to the invention.

FIG. 6 illustrates a flowchart 600 wherein defective and/or spare sectors are identified and counted, and a new logical track is initiated if a predetermined number of defective and/or spare sectors occur within the track. In step 602, the mapping of the track is initiated. In step 604, defective and/or spare sectors are identified and counted. In step 606, the controller or interface processor determines whether a predetermined number of defective and/or spare sectors have been counted so far within the track. If the predetermined number of defective and/or spare sectors has been identified and counted 608, the controller proceeds to step 610. In step 610, the controller starts a new logical track at the first usable (not a defect or spare) sector after the sector which exceeded the limit. However, if a predetermined number of defective and/or spare sectors have not been identified and counted 612, the controller determines whether the end of the physical track is encountered 614. If the end of the track is encountered 616, then the operation is completed 618. If the end of the track is not encountered 620, then the controller resets its count of defective and/or spare sectors to zero 622, loops back and begins a new count 604. This process continues until the end of the track is encountered.

Thus, according to the present invention, if any physical track is found to have more than the fixed number of allowable defects and/or spares, it may be remapped into two or more logical tracks, each logical track having fewer than the maximum number of allowable defects and or spares with its track boundaries. Each of these new logical tracks is then treated like a physical track in normal drive operations (i.e., the logical track is considered a full track by the controller function driving the actual transfer).

An arbitrary, variable start and ending point for the track in a logical basis is established. As a result of the mapping of a new logical block address after the predetermined number of defective sectors has been reached, the defects at the very beginning and at the very end of the previous logical track should not be counted or stored in the track detail thereby saving the normal memory required for mapping of the defects.

With previous methods which allow more defects per track, more time is required to map an entire track of defects than allowed by track skew. Track skew is the amount of time that it takes the servo to switch from one head to the next. This means that the method would necessitate another revolution. Accordingly, the invention reduces the chance for a missed revolution of the disk at head switch due to excessive defects.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A system comprising a processor operatively coupled to a storage medium having a physical track for recording data therein, the processor determining a number of defective and/or spare sectors which exist in the physical track, the processor further mapping the physical track into at least two logical tracks if the physical track has more than a predetermined number of defective and/or spare sectors therein.

2. The system of claim 1 wherein the at least one two logical tracks has fewer than the predetermined number of defective and/or spare sectors within its boundaries.

3. The system of claim 1 wherein a track detail is created for the at least two logical tracks.

4. The system of claim 3 wherein the track detail does not include defects outside of the logical track boundaries.

5. The system of claim 1 wherein a second logical track is initiated at a first sector after the predetermined number of defective and/or spare sectors has been counted.

6. The system of claim 1 wherein the mapping of each logical track is initiated in response to counting the predetermined number of defective and/or spare sectors.

7. The system of claim 6 wherein the count is restarted after each logical track is initiated.

8. The system of claim 1 wherein the at least two logical tracks comprise different logical track lengths.

9. The system of claim 1 wherein the mapping of the physical track into at least two logical tracks is performed at manufacturing of the storage medium.

10. The system of claim 1 wherein the physical track is dynamically mapped into the at least two logical tracks during operation.

11. The system of claim 1 wherein the mapping of the physical track into the at least two logical tracks creates a variable start and ending point for the physical track.

12. The system of claim 3 further comprising a memory.

13. The system of claim 12 wherein the track detail comprises cylinder, head number, starting sector, number of sectors and a defect location list.

14. The system of claim 13 wherein the track detail is stored in memory.

15. The system of claim 12 wherein the memory is solid-state memory.

16. The system of claim 12 wherein the memory is an area on the storage medium.

17. The system of claim 12 wherein a servo seek is driven from the track detail.

18. A disk drive, comprising:
at least one rotatable storage media having concentric physical tracks for recording data thereon;
a housing, the rotatable storage media being rotatably attached to the housing;
an actuator arm assembly, coupled to the housing;
a sensor, coupled to the actuator arm, for reading and writing data on the rotatable storage media; and
a processor, operatively coupled to the rotatable storage media, the processor determining a number of defective and/or spare sectors which exist in the physical track, the processor further mapping the physical track into at least two logical tracks if the physical track has more than a predetermined number of sectors.

19. The disk drive of claim 18 wherein the at least two logical tracks has fewer than the predetermined number of defective and/or spare sectors.

20. The disk drive of claim 18 wherein a track detail is created for the at least two logical tracks.

21. The disk drive of claim 20 wherein the track detail does not include defective and/or spare sectors outside the logical track boundaries.

22. The disk drive of claim 18 wherein a second logical track is initiated at a first sector after the predetermined number of defective and/or spare sectors has been counted.

23. The disk drive of claim 18 wherein the mapping of each logical track is initiated in response to counting the predetermined number of defective and/or spare sectors.

24. The disk drive of claim 23 wherein the count is restarted after each logical track is initiated.

25. The disk drive of claim 18 wherein the at least two logical tracks comprise different logical track lengths.

26. The disk drive of claim 18 wherein the mapping of the physical track into at least two logical tracks is performed at manufacturing of the storage media.

27. The disk drive of claim 18 wherein the physical track is dynamically mapped into the at least two logical tracks during operation.

28. The disk drive of claim 18 wherein the mapping of the physical track into the at least two logical tracks creates a variable start and ending point for the physical track.

29. The disk drive of claim 20 further comprising a memory.

30. The disk drive of claim 29 wherein the track detail comprises cylinder, head number, starting sector, number of sectors and a defect location list.

31. The disk drive of claim 29 wherein the memory is solid-state memory.

32. The disk drive of claim 29 wherein the memory is an area on the storage medium.

33. The disk drive of claim 29 wherein a servo seek is driven from the track detail.

34. A rotatable storage medium, comprising concentric physical tracks for storing data, each physical track including a plurality of sectors comprising a number of bytes of data, each physical track further being divided into at least two logical tracks when a predetermined number of sectors within the physical track are defective.

35. The storage medium of claim 34 wherein the at least two logical tracks comprises fewer than the predetermined number of defective and/or spare sectors.

36. The storage medium of claim 34 wherein a track detail is created for the at least two logical tracks.

37. The storage medium of claim 36 wherein the track detail does not include defective and/or spare sectors outside the logical track boundaries.

38. The storage medium of claim 34 wherein a second logical track is initiated at a first sector after the predetermined number of defective and/or spare sectors has been counted.

39. The storage medium of claim 34 wherein the mapping of each logical track is initiated in response to counting the predetermined number of defective and/or spare sectors.

40. The storage medium of claim 39 wherein the count is restarted after each logical track is initiated.

41. The storage medium of claim 34 wherein the at least two logical tracks comprise different logical track lengths.

42. The storage medium of claim 34 wherein the mapping of the physical track into at least two logical tracks is performed at manufacturing of the storage media.

43. The storage medium of claim 34 wherein the physical track is dynamically mapped into the at least two logical tracks during operation.

44. The storage medium of claim 34 wherein the mapping of the physical track into the at least two logical tracks creates a variable start and ending point for the physical track.

45. The storage medium of claim 36 further comprising a memory.

46. The storage medium of claim 45 wherein the track detail comprises cylinder, head number, starting sector, number of sectors and a defect location list.

47. The storage medium of claim 45 wherein the memory is solid-state memory.

48. The storage medium of claim 45 wherein the memory is an area on the storage medium.

49. The storage medium of claim 45 wherein a servo seek is driven from the track detail list.

50. A method for addressing physical tracks, comprising the steps of:

counting the number of defective and/or spare sectors on a physical track; and mapping the physical track into at least two logical tracks when at least a predetermined number of sectors on the physical track are defective and/or spare.

51. The method of claim 50 wherein less than the predetermined number of defective or spare sectors are within the track boundaries of the logical track.

52. The method of claim 50 wherein the step of dividing the physical track into at least two logical tracks further comprises the step of setting as a beginning of a new logical track a first sector occurring after the predetermined number of defective and/or spare sectors have been counted.

53. The method of claim 52 further comprising the step of adding the new logical track to a track detail list.

54. The method of claim 53 further comprising the step of ignoring the predetermined number of defective and/or spare sectors such that the predetermined number of defective and/or spare sectors are not stored in the track detail.

55. The method of claim 50 wherein the step of mapping the physical track into at least two logical tracks comprises the step of initiating each logical track in response to counting the predetermined number of defective and/or spare sectors.

56. The method of claim 55 further comprising the step of restarting the count after each logical track is initiated.

* * * * *